United States Patent

MacLeod

[11] Patent Number: 6,090,156
[45] Date of Patent: Jul. 18, 2000

[54] SYSTEM FOR LOCAL CONTEXT SPILLING FOR GRAPH COLORING REGISTER ALLOCATORS

[75] Inventor: Andrew Wilfred MacLeod, Etobicoke, Canada

[73] Assignee: International Business Machines Corporation, Armonk, N.Y.

[21] Appl. No.: 09/079,556

[22] Filed: May 15, 1998

[30] Foreign Application Priority Data

May 22, 1997 [CA] Canada .................................. 2205797

[51] Int. Cl.[7] .............................. G06F 9/445; G06F 9/45
[52] U.S. Cl. ..................................................... 717/9; 717/7
[58] Field of Search .................................. 395/707, 709; 345/440

[56] References Cited

U.S. PATENT DOCUMENTS

| | | | |
|---|---|---|---|
| 4,571,678 | 2/1986 | Chaitin ..................................... | 395/707 |
| 4,656,582 | 4/1987 | Chaitin et al. .......................... | 395/707 |
| 4,782,444 | 11/1988 | Munshi et al. .......................... | 395/709 |
| 5,249,295 | 9/1993 | Briggs et al. ............................ | 395/709 |
| 5,784,066 | 7/1998 | Aizikowitz et al. ..................... | 345/440 |

OTHER PUBLICATIONS

Eichenberger–Davidson, Register Allocation for Predicated Code, Proceedings of the 28th Annual International Symposium on Microarchitecture, IEEE, Nov. 1995.

Foster III–Grossman, An Empirical Investigation of the Haifa Register allocation Technique in the GNU C Compiler, Southeastcon '92, Proceedings, IEEE, Apr. 1992.

Bernstein et al., Spill Code Minimization Techniques for Optimizing Compilers, ACM, Jan. 1989.

Callahan–Koblenz, Register Allocation via Hierarchical Graph Coloring, ACM SIGPLAN 91, Jun. 1991.

Chen–Alewine–Fuchs–Hwu, Incremental Compiler Transformations For Multiple Instruction Retry, Software–Practice and Experience, V.24(12), 1179–1198, Dec. 1994.

Callahan–Koblenz, Register Allocation via Hierarchical Graph Coloring, Proceedings of the ACM SIGPLAN'91 Conference on Programming language Design and Implementation, Jun. 1991.

Norris–Pollock, An Experimental Study of Several Cooperative Register Allocation and Instruction Scheduling Strategies, Proceedings of MICRO–28, IEEE, Jan. 1995.

*Primary Examiner*—Tariq R. Hafiz
*Assistant Examiner*—Hoang-Vu Antony Nguyen-Ba
*Attorney, Agent, or Firm*—Scully, Scott, Murphy & Presser; Jay P. Sbrollini, Esq.

[57] ABSTRACT

A register allocator for allocating machine registers during compilation of a computer program. The register allocator performs the steps of building an interference graph, reducing the graph using graph coloring techniques, attempting to assign colors (i.e. allocate machine registers to symbolic registers), and generating spill code. The spill code is generated by a local context spiller which processes a basic block on an instruction by instruction basis. The local context spiller attempts to allocate a machine register which is free in the basic block. If the basic block does not have any free machine registers, the local context spiller looks ahead to select a machine register for spilling. The register allocator improves the performance of a compiler by limiting the rebuilding of the interference graph and the number of the graph reduction operations.

6 Claims, 4 Drawing Sheets

SYSTEM FOR LOCAL CONTEXT SPILLING FOR GRAPH COLORING REGISTER ALLOCATORS

COPYRIGHT NOTICE

A portion of the disclosure of this patent document contains material to which a claim of copyright protection is made. The copyright owner has no objection to reproduction of the patent document or patent disclosure as it appears in the Patent Office patent file or records, but reserves all other rights.

FIELD OF THE INVENTION

This invention relates to computer systems, and more particularly to a method for allocating register usage for a computer program.

BACKGROUND OF THE INVENTION

Global register allocation is an on-going problem in the design and optimization of compiler performance. The problem is to reduce a large number of symbolic registers down to a small finite number of hardware registers. Whenever this is not possible, some registers must be stored in memory and re-loaded only when needed. These registers are referred to as "spilled" registers.

Most compilers assume an arbitrarily large number of registers during their optimization procedures. In fact the result of each different computation in the program is conventionally assigned a different symbolic register. At this point a register allocation procedure must be invoked to assign real, i.e. hardware registers, from those available in the machine, to these symbolic registers. Conventional approaches use a subset of the real registers for special purposes while the remaining set is assigned locally within the statement, or at best the basic block (e.g. a loop). Between these assignments, results which are to be preserved are temporarily stored, and variables are redundantly reloaded. While these approaches clearly work, they are inefficient in that a significant amount of processor (i.e. CPU) time is wasted while data is being transferred between memory storage and registers or conversely, data is accessed from and returned to storage directly bypassing the registers completely.

Graph colouring is a well-known technique for allocating registers during compilation. The graph colouring technique is based on the observation that the register assignment or allocation problem is equivalent to the graph colouring problem, where each symbolic register is a node and the real, i.e. hardware, registers are different colours. When two symbolic registers have the property that there is at least one point in the program when both their values must be retained, that property is modelled on the graph as a vertex or edge between the two nodes. Thus the register allocation problem is equivalent to the problem of colouring the graph so that no two nodes connected by a vertex are coloured the same. This is equivalent to saying that each of these two (or more) nodes must be stored in different registers.

Two main approaches exist for global register allocation using graph colouring. The first is known as the Chaitin style graph colouring by Gregory J. Chaitin. The Chaitin technique has been enhanced by Preston P. Briggs at Rice University.

According to the Chaitin graph colouring technique, two symbolic registers are said to interfere if they are live, i.e. contain a value, at the same time. This means that the two symbolic registers cannot occupy the same hardware or machine register. The degree of a register is defined as the number of other registers which interfere with it.

A pass is made through the program to build an interference graph. The interference graph summarizes what symbolic registers interfere with each other, and each symbolic register is represented by a node in the graph. Once the interference graph is built, graph reduction is attempted. Any register whose degree is less than the number of hardware a registers, i.e. "colours", is removed from the graph, and pushed onto a reduction stack. According to the Chaitin technique, if a node has less interferences than the number of hardware registers, then there must be a hardware register that can be assigned to the node, i.e. symbolic register. When a node is removed, the degree of all its neighbours is reduced by one. This reduction process is continued until either the graph is empty, signifying successful colouring, or all remaining nodes have a degree that is too high to be reduced.

If nodes remain, one of the nodes, i.e. symbolic registers, is chosen for spilling (i.e. storage in memory). There are various heuristics, and how the choice is made will be apparent to one skilled in the art. Accordingly, one of the remaining nodes is chosen and marked to "spill"; the selected node is then pushed onto the reduction stack, and removed from the interference graph. The reduction operation is repeated on the graph with the remaining nodes in an attempt to further reduce the number of nodes (i.e. symbolic registers). The reduction process is repeated until the graph completely reduces. In complex programs with numerous symbolic registers, many registers will be marked to spill.

Once the reduction operation has been completed, the symbolic registers are assigned to colours (i.e. hardware registers). Initially, each symbolic register can be assigned any available colour or hardware register. The symbolic registers are removed from the reduction stack, and as each symbolic is removed, the lowest available colour number for that register is assigned to the symbolic. Next all the neighbours of the symbolic register in the interference graph are visited, and the assigned colour is removed from their available colour list. This prevents any registers which interfered from choosing the same colour.

According to the Chaitin technique, any symbolic register which was reduced normally, i.e. not spilled, is guaranteed to be given a colour, i.e. assigned a hardware register. Such a symbolic register is said to have been proven. Conversely, any symbolic register that was marked to spill is not expected to get a colour. Sometimes symbolic register marked to spill will end with a colour, and this is the 'optimistic' approach developed by Briggs. In any case, according to Chaitin spill code needs to be generated for a symbolic register which cannot be given a colour.

Another pass is made through the program, and any reference to a symbolic register which is marked to spill is replaced with either a memory load or store. It will be appreciated that this operation effectively splits the live range of the spilled registers to very local occurrences where they are used or defined.

Once the spill code has been generated, the reduction process is repeated starting with building a new interference graph. The cycle is repeated until the graph successfully reduces. In many cases, multiple iterations of colouring are required to successfully reduce a graph, i.e. assign all the data items (i.e symbolic registers) to machine registers and memory storage.

The Chaitin style graph colouring technique has been found to work quite well. However, problems with the Chaitin technique arise when there are more data items to be retained than there are machine registers available. As described above, when the data items (i.e. symbolic registers) exceed the number of machine registers "spilling" of the symbolic registers into memory is necessary.

The generation of efficient spill code is not trivial. The approach according to Chaitin required that a load to memory be issued at each use point of a spilled symbolic. Following this approach, if there are two uses of a symbolic register on consecutive instructions, it is preferable to only perform the memory load once, and use the data item on both instructions. Similarly, if the two uses of the symbolic register are just close together, it is advantageous to perform the memory load once and re-use the data item. With the Chaitin approach, as the live range of a re-used spill is extended, there is the risk that a new interference will be caused which will require another pass of colouring.

Most programs will have 'hot spots' which have high register pressure. These are the areas in a program which cause most of the spilling of the data items (i.e. symbolic registers). When a symbolic register is chosen to be spilled, the register is spilled everywhere even in other areas where there is no interference with the symbolic register. This is an artifact of global spilling. No local information is available about individual uses of a register, just the global interference graph.

To improve register allocation several approaches have been developed in the art.

Rematerialization is one known approach where the value of the symbolic register is recalculated instead of loading the data item from memory. Rematerialization reduces the number of memory stores which need to be spilled.

Another approach involves partitioning the interference or flow graph and colouring the different partitions separately. This approach attempts to reduce the global effect of spilling, so that if a symbolic register spills in one partition, the register doesn't need to spill in the other partitions. While this approach is workable, problems usually arise with "patch-up" code for bridging the partitions.

In another approach, the register sets are split into two groups: global and local registers. The global symbolic registers are assigned to the global hardware registers, and then a local allocation is performed to assign the remaining registers. While this approach is workable, it does not always result in optimal good global allocations because all the registers are not available.

According to another approach, "live range" splitting is performed before the colouring (i.e. reduction) process. In this approach, any registers with long live ranges over high pressure or "hot" regions in the program are stored before entry and loaded after exit to the region. This makes the register(s) appear to be a different register in the high pressure region.

The graph colouring approach according to Chaitin/Briggs has proven very effective. Experience has shown that many procedures "colour" so that no store-load operations are necessary to keep results in storage temporarily. On the down side, the Chaitin/Briggs requires large amounts of compile time.

Therefore, a need remains for a register allocator which requires less computation time, and which also provides a better approach to the spilling problem.

BRIEF SUMMARY OF THE INVENTION

The present invention provides a method for register allocation utilizing graph colouring and provides local context spilling for producing improved spill code. Advantageously, the register allocation method reduces the computation intensive operations needed in conventional interference graph reduction and graph colouring techniques.

The method according to the present invention comprises the steps of building an interference graph, performing graph reduction, choosing spills, attempting to assign colours, and generating spill code.

According to the present invention when a colour (i.e. hardware) register cannot be assigned to a symbolic register that has been removed from the reduction stack, that register is skipped for the time being and the register assigning procedure continues, and an attempt is made to give as many registers as possible colours. The symbolic registers remaining without colours represent the spilled registers. The coloured symbolic registers are now committed to hardware registers. A pass is then made through the program, and all references to the coloured registers are replaced with an appropriate hardware register. The program now appears as mostly hardware registers, but any symbolic registers which were spilled still appear as their original symbolic, i.e. the registers have not been changed. The next step in the register allocation procedure involves invoking a local context spiller. The local context spiller steps through the program and attempts to assign hardware registers for the spilled symbolic registers. Because all the hardware registers are used in the program, there will be many places where there are very few, if any registers available. The registers will have been assigned as well as possible using the graph colouring technique. Instead of performing additional reduction passes, the method according to the present invention invokes a local context spiller. According to this aspect of the invention, the local context spiller processes the program and assigns hardware registers to the spilled symbolic registers in the context of basic blocks. For each basic block, the local context spiller looks for any available hardware registers, and if available, the registers are assigned to the symbolic registers. If the basic block does not have any available hardware registers, the local context spiller selects a hardware register which is spilled and then assigned to the symbolic register.

In one aspect, the present invention provides a register allocation procedure for a compiler for converting a high level source code program into a machine executable program, the compiler includes an optimizer for translating the high level source code into an intermediate language wherein storage requirements for the program are specified as a plurality of symbolic registers, said register allocation procedure comprising the steps of: (a) generating an interference graph for said program; (b) reducing said interference graph via application of graph reduction techniques; (c) allocating machine registers to said program via graph colouring techniques without spilling; (d) applying local context spilling to allocate registers which were not allocated using said graph colouring techniques; (e) said local context spilling comprising determining one or more free registers in a section of said intermediate language program, and allocating said free registers to the symbolic registers in said program, and when it is determined that the section does not have a free register, selecting a register for spilling and generating spill code for instructing said program to spill said register.

In a second aspect, the present invention provides a compiler for converting a high level source code program into a machine executable program, said compiler comprising: a parser for translating said source code into an intermediate language program wherein storage requirements for said program are specified as a plurality of symbolic registers; an optimizer for optimizing operation of said intermediate language program; a register allocator for rewriting symbolic registers to machine registers in the intermediate language program; a code generator for generating the machine executable program from said rewritten intermediate language program; said register allocator having means for generating an interference graph for said intermediate language program, graph reduction means for reducing the number of symbolic registers in said interference graph, and graph colouring means for allocating machine registers to said symbolic registers without spilling; and said register allocator further including a local context spiller for allocating a machine register to a symbolic register not allocated by said graph colouring means, said local context spiller comprising means for determining availability of a free machine register in a section of said program and means for allocating said free machine register to said symbolic register, and said local context spiller further including means for selecting a machine register for spilling when the section of the program does not have any free machine registers.

In another aspect, the present invention provides a computer program product for use in a computer system to compile a high level source code program and generate a machine executable program, said computer program product comprising: a recording medium; means recorded on said medium for instructing said computer system to perform the steps of, (a) translating said high level source code into an intermediate language program wherein storage requirements for said program are specified as a plurality of symbolic registers; (b) optimizing operation of said intermediate language program; (c) rewriting symbolic registers to machine registers in the intermediate language program; (d) generating the machine executable program from said rewritten intermediate language program; (e) wherein rewriting said symbolic registers to machine registers comprises the steps of, generating an interference graph for said program, reducing said interference graph via application of graph reduction techniques, allocating machine registers to said program via graph colouring techniques without spilling, applying local context spilling to allocate registers which were not allocated using said graph colouring techniques, said local context spilling comprising determining one or more free machine registers in a section of said intermediate language program, and allocating said free machine registers to the symbolic registers in said program, and when it is determined that the section does not have a free machine register, selecting a machine register for spilling and generating spill code for instructing said program to spill said selected machine register.

BRIEF DESCRIPTION OF THE DRAWINGS

Reference will now be made to the accompanying drawings, which show, by way of example, a preferred embodiment of the present invention, and in which.

DETAILED DESCRIPTION OF THE PREFERRED EMBODIMENT

Figure 1:
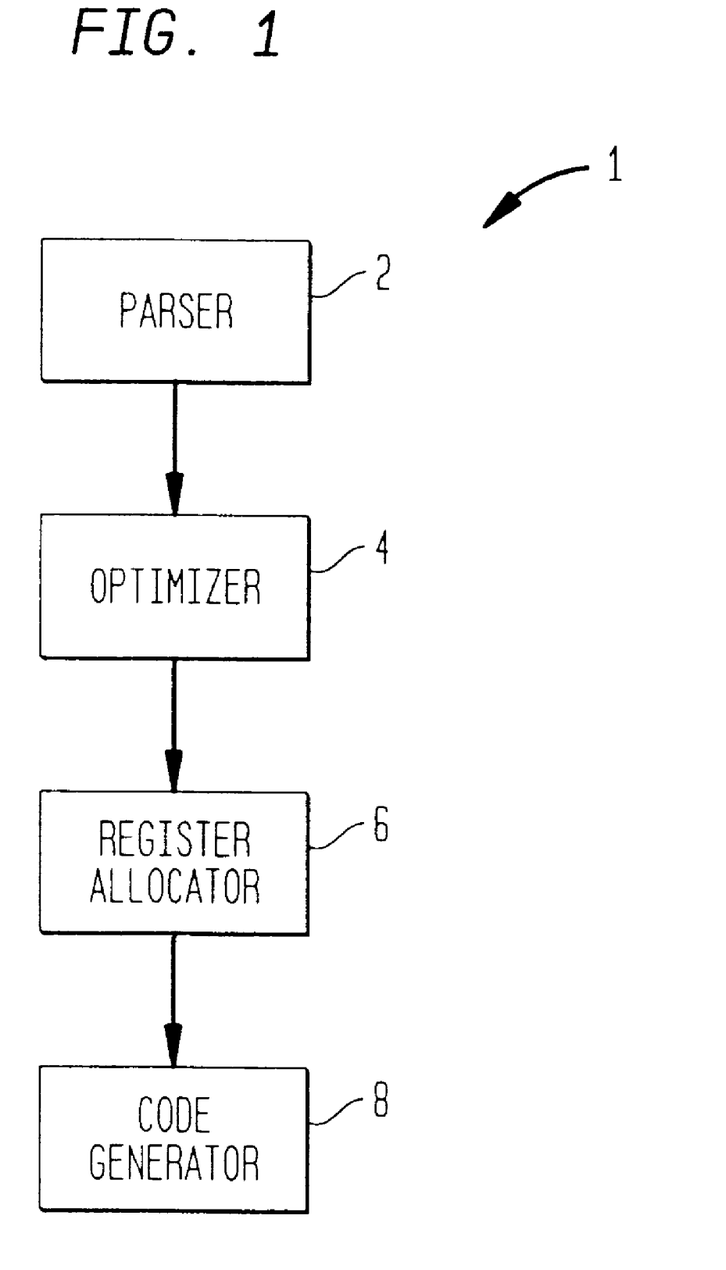
FIG. 1 is a block diagram showing a compiler incorporating a register allocator according to the present invention.

Reference is first made to FIG. 1, which shows a compiler 1 utilizing a register allocator according to the present invention. The compiler 1 comprises a program which reads statements (i.e. source code) written in a human-readable programming language, such as Fortran or C, and translates them into a machine-readable/executable program. As shown, the compiler 1 includes four principal components or modules: a parser 2, an optimizer 4, a register allocator 6 and a code generator 8.

The parser 2 translates the source code into an intermediate language (IL) which is understood by the compiler 1. The optimizer 4 performs various optimizing operations on the intermediate language to improve the execution performance of the compiled code. The register allocator 6 rewrites the symbolic registers generated in the intermediate language program to hardware registers defined on the target machine (computer). The code generator 8 translates the instructions in the intermediate language into executable instructions for the target machine and produces an executable program. The present invention is directed to the register allocator 6 as will be described in detail below. The details of the parser 2, the optimizer 4 and the code generator 8 are within the understanding of one skilled in the art and therefore further description is not needed.

The register allocator 6 comprises a procedure for allocating the symbolic registers in the intermediate language IL program to actual hardware registers on the target machine. The symbolic registers correspond to data items in original source code program. Once the symbolic registers have been allocated, the intermediate language program is translated into an executable program by the code generator 8 (FIG. 1).

Figure 2:
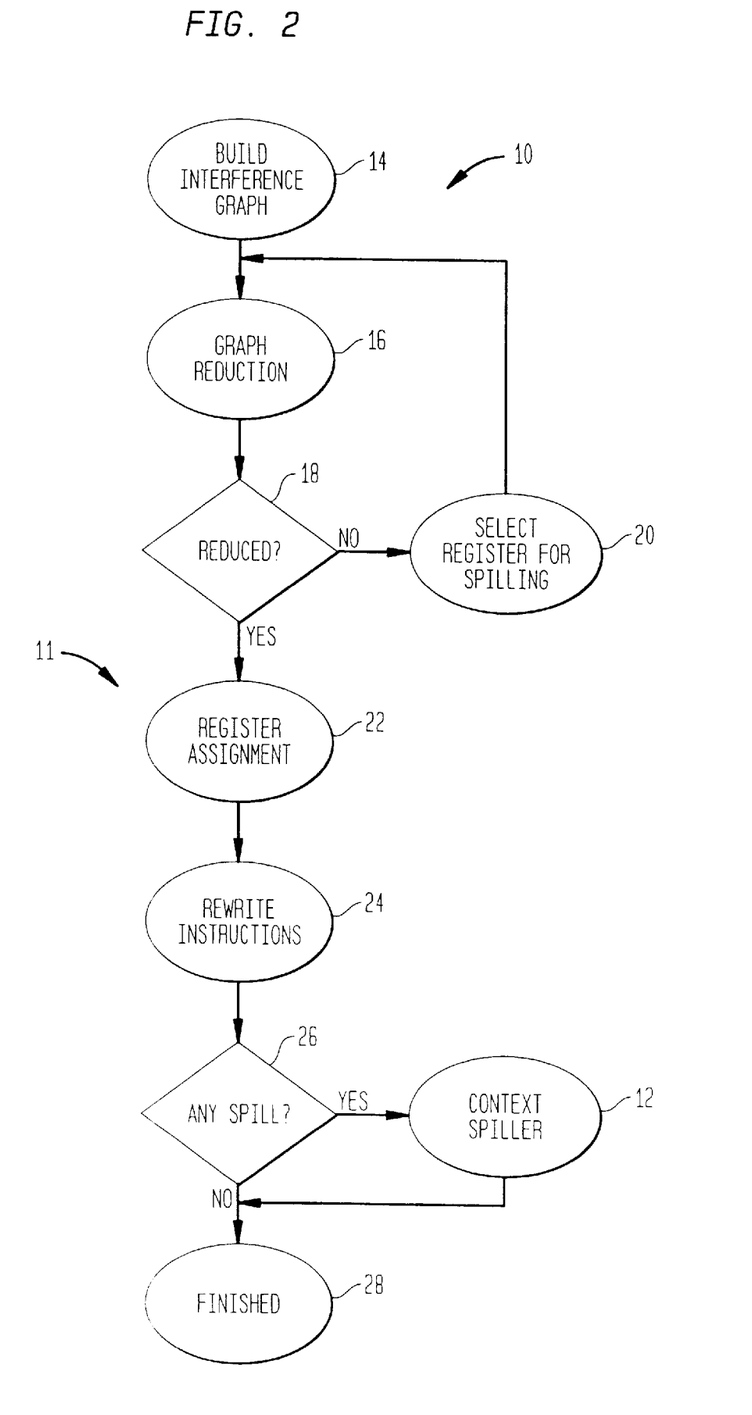
FIG. 2 shows in high level flow chart form a method for register allocation with local context spilling according to the present invention.

Reference is made to FIG. 2 which shows a procedure for register allocation 10 according to the present invention. The register allocation procedure 10 comprises two principal components a graph colouring component 11 and a local context spiller 12.

As shown in FIG. 2, the first step (block 14) in the register allocation procedure 10 comprises building an interference graph. Next in step 16, the interference graph is reduced using standard reduction techniques according to Chaitin-Briggs. If the interference graph cannot be entirely reduced (decision block 18), then a symbolic register is selected for spilling in step 20, and the graph reduction step 16 is repeated.

Once the interference graph has been reduced (step 18), the next operation in step 22 involves assigning (i.e. colouring) the symbolic registers to hardware or machine registers. According to this aspect of the invention, if a symbolic register removed from the reduction stack cannot be coloured, i.e. assigned to a hardware register, the symbolic register is skipped and marked as a spilled register. The process continues for the remaining registers in the reduction stack. At the completion of the register assignment operation in step 22, as many symbolic registers as possible will have been assigned to hardware registers, i.e. coloured, and the unassigned registers will comprise spilled symbolic registers. At this stage, the coloured symbolic registers are committed to hardware registers. Next in step 24, a pass is made through the program (i.e. intermediate language), and the references to the coloured symbolic registers are replaced with the corresponding hardware register.

At the completion of the rewrite instructions step 24, the intermediate language program will appear with mostly hardware registers, but any symbolic registers which were spilled will still appear in their original symbolic form. In step 26, the procedure 10 checks for symbolic registers which have spilled, i.e. allotted for storage in memory. The spilled symbolic registers are processed by a context spiller 12 in accordance with the present invention. As will now be described the context spiller 12 assigns the spilled symbolic registers to hardware registers on a local basis (instead of a global basis in the reduction process described above).

The local context spiller 12 acts on a single basic block at a time in the intermediate language code. A basic block is defined as a section of code which has a single entry point and a single exit point. The local context spiller 12 models the contents of each hardware register and the registers are initialized based on which registers are live on entry to the basic block in the IL code.

Each hardware register can be in one of three states: (1) FREE, (2) INUSE; or SYMBOLIC. The FREE state indicates a hardware register which is not in use. The INUSE state indicates a hardware register which has an active value assigned by the graph colouring operation. The SYMBOLIC state signifies a hardware register which currently holds the value of a specified symbolic register. Initially for a basic block, the hardware registers are either in the FREE state or the INUSE state.

To track the "live" registers, the local context spiller 12 processes the basic block instruction by instruction to generate a dynamic model of hardware register activity. At any given instruction in the basic block, the dynamic model shows which hardware registers are being used by the program, and more importantly, which hardware register are not being used. As will be described, the unused hardware registers are utilized to load and store the symbolic registers as required.

Figure 3:
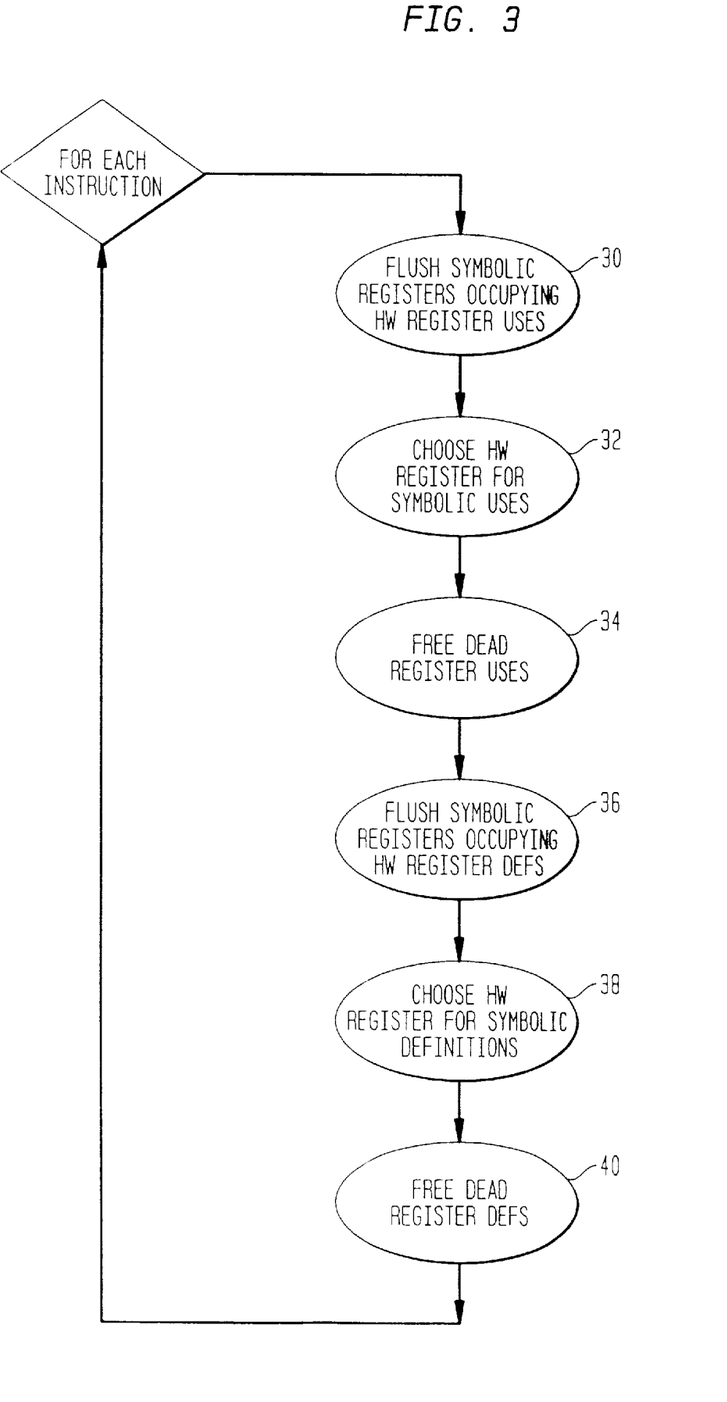
FIG. 3 is a detailed flow chart showing the method steps for processing an instruction for the method of FIG. 2.

Reference is made to FIG. 3 which shows in more detail the steps performed by the local context spiller 12 for processing each instruction in a basic block. First in step 30, the context spiller 12 flushes symbolic registers which are occupying hardware registers that are explicitly referenced on the instruction. Next in step 32, the context spiller 12 chooses the hardware registers for symbolic uses. In step 34, the context spiller 12 frees the dead hardware registers. A hardware register goes dead during the last use before the register is redefined in another instruction, i.e. the value contained in the hardware register is not used again before the register is redefined. The local context spiller 12 changes the state of the register to FREE in step 34. Next in step 36, the context spiller 12 flushes the symbolic registers which are occupying hardware register definitions that are explicitly referenced on the instruction. In step 38, the context spiller 12 chooses the hardware register for the symbolic definitions. Lastly in step 40, the context spiller 12 frees any dead register definitions.

The context spiller 12 repeats the processing steps depicted in FIG. 3 for each instruction in the basic block. The result of the instruction processing is the dynamic model of the hardware register activity for the basic block.

The next operation performed by the local context spiller 12 is assigning the hardware registers to the symbolic registers.

When the context spiller 12 first examines an instruction, the spiller 12 determines the uses for the instruction. If a symbolic register is encountered, the value of the symbolic is loaded from memory into a hardware register and that hardware register is used on this instruction. After processing the uses, the context spiller 12 processes the definitions and if a symbolic register is encountered, the symbolic is given a hardware register and the value is stored to memory.

When choosing a hardware register for a symbolic, the context spiller 12 first tries to assign a hardware register which is FREE (i.e. not being used for anything). If a FREE hardware register is available, the spiller 12 promotes the register to the SYMBOLIC state, and associates the register with the symbolic register. Next, a load from spill into the hardware register is issued, and the symbolic on the instruction is replaced with the hardware register.

When the context spiller 12 encounters an actual use of a hardware register in an instruction, the hardware register is moved to the INUSE state. If the hardware register was in previously in the SYMBOLIC state, then the register will no longer be associated with a symbolic register.

It will be appreciated that as the context spiller 12 steps through the instructions in a basic block, the FREE registers are slowly converted into SYMBOLIC registers. If the context spiller 12 encounters a symbolic register which is already associated with a hardware register (i.e. the hardware register is in the SYMBOLIC state and associated with the symbolic register), the spiller 12 replaces the symbolic reference with the hardware register. No load from spill is required and the spiller 12 achieves spill re-use whenever possible.

If a definition of a symbolic register is encountered and the symbolic remains in the hardware register until it goes dead, i.e. the last use, then the original store to memory is also avoided and the spilled register have been eliminated. However, the number of free hardware registers is limited. The context spiller 12 attempts to provide FREE hardware registers by determining the final use of a symbolic register. When a final use of a symbolic register is encountered, the context spiller 12 moves the hardware register to the FREE state.

There will however be situations when there are no more FREE hardware registers. When this occurs, the context spiller 12 looks at all the hardware registers in the SYMBOLIC state, and picks and uses one of the hardware registers in the SYMBOLIC state. (The selection process for the SYMBOLIC hardware is described below.) In practical terms, this approach means that possible re-use of the symbolic that is in the hardware register is eliminated, but the hardware register is made available for the new symbolic register.

In the situation where all the hardware registers are INUSE, the context spiller 12 will spill a hardware register. (In a conventional compiler, such an occurrence will cause multiple passes of the original iterative process.) The context spiller 12 selects one of the hardware registers and stores the contents of the hardware register to a new spill location. The hardware register is then used for the symbolic register. Because the hardware register does not have to be reloaded with the spilled code until its next use which could be some distance away, the context spiller 12 leaves the hardware register spilled. As a result, the context spiller 12 has obtained one more hardware register which can be used for symbolics until the next use for the hardware register is encountered.

If any spilled hardware registers have not been reloaded by the end of the basic block, then the context spiller 12 reloads the spilled hardware registers even though there is no use. Since the hardware registers will be used in another basic block, it is preferable to have the hardware registers loaded with their correct values.

Figure 4:
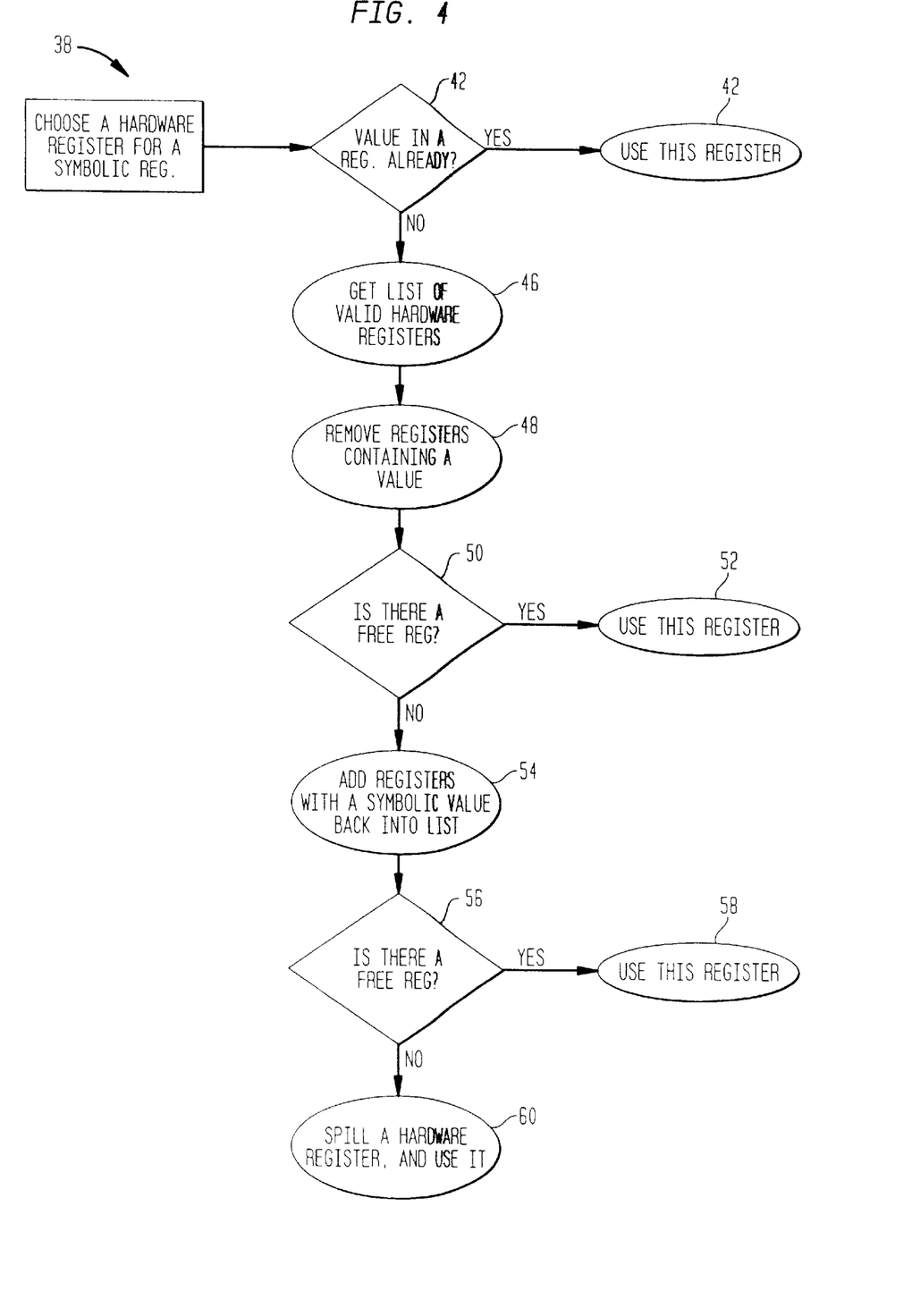
FIG. 4 is a detailed flow chart showing the method steps for a choosing a hardware register for a symbolic register as part of the processing in FIG. 3.

The processing steps for choosing a hardware register for a symbolic register (step 38 in FIG. 3) may be summarized with reference to FIG. 4. The context spiller 12 first determines if the symbolic value (i.e. register) is already in a hardware register in step 42. If yes, this hardware register is used (step 44). If the symbolic register is not already in a hardware register, then the context spiller 12 needs to find a hardware register for the symbolic register. In step 46, the context spiller 12 gets a list of valid hardware registers. Next in step 48, the spiller 12 removes hardware registers from the list which contain a value, i.e. hardware registers which are in USE or SYMBOLIC. If there is an available hardware register (step 50), then the context spiller 12 uses this register for the symbolic register (step 52). If there are no available hardware registers, then the context spiller 12 will need to use one of the hardware registers which is already in the SYMBOLIC state. In step 54, the SYMBOLIC hardware registers are added back on the list of available hardware registers. Next in step 56, the context spiller 12 determines if there is an available register from the list of available of hardware registers. If there is an available register, the context spiller 12 uses the register for the symbolic register (step 58). If a register is not available, then the context spiller 12 needs to spill a hardware register and use the spilled register for the symbolic register (step 60).

While the context spiller 12 can utilize a number of approaches in the selection of the hardware register to be spilled (i.e. step 60 in FIG. 4), the selection of the hardware register can be critical. For example, if there is a use of the hardware register only a few instructions away, the register will have to be reloaded again. Therefore, it is preferable to choose a hardware register with a symbolic which is referenced the furthest away from the present instruction.

As described above, the local context spiller 12 generates a dynamic model (e.g. list) of the registers in the basic block. During the processing of an instruction in the basic block, the spiller 12 determines which registers are referenced, as well as uses, definitions, or dead uses. This information is then summarized for the instruction and stored in memory. By summarizing and storing the register information for a number of instructions ahead of the current instruction, the near future (as far as register usage is concerned anyway) can be ascertained without any significant increase in computation time.

With the look-ahead summaries, the local context spiller 12 can make a more informed decision on which symbolic value to replace in order to free a hardware register. Using the summaries, the context spiller 12 replaces the symbolic whose next use is not present in the summaries. The spiller 12 can also choose to replace a symbolic which resides in a hardware register that has an upcoming reference. If this reference to the hardware register happens before the symbolic is referenced, then the symbolic will have to be replaced at that point anyway.

Similarly, the look-ahead summaries also allow the context spiller 12 to choose which hardware register to spill. The spiller 12 chooses to spill a hardware register for which it can't see a use, or whose first use is the farthest away.

As described above, the local context spiller 12 initially takes the live-on-entry information for a basic block and sets each hardware register to either the FREE or INUSE states. To propagate information from the exit of one block to the entry of its successors, the basic blocks are processed in region-order. Region-order as will be understood by one skilled in the art means that all predecessors of a basic block are visited before processing the block itself, with back edges being the exception.

This approach allows initialization of the istate of a basic block to the MERGE of all predecessors exit states. In addition, the spill across flow can be reused. Therefore, if all loads are removed this way, then the stores can be removed as well. Accordingly, a hardware register is INUSE if it is INUSE on any predecessor; a hardware register is SYMBOLIC if it is SYMBOLIC on ALL predecessors, and is associated with the same symbolic on all paths, otherwise it is FREE; a hardware register is FREE if it is FREE on ALL predecessors.

During the processing of definitions, instead of issuing the store to spill immediately, the context spiller 12 can mark the hardware register as having a pending store, mark the location, but not issue the store. When a symbolic register is replaced in a hardware register by another symbolic register, the spiller 12 checks if the pending store flag is set, and if set, the spiller issues the store to spill then. The same is true at the end of a basic block. Any symbolic register in a hardware register which has a pending store flagged, must have the store to spill issued. This prevents the context spiller 12 from issuing any stores which are not needed because all the loads were eliminated.

Typically, a program will include some instructions which will have restrictions on the registers which can occupy various positions. Quite often, the use location is more restrictive than the definition locations. When looking for a hardware register for a symbolic, the context spiller 12 needs a set of valid registers. Initially, all of the hardware registers will be valid, but the number will be reduced by restrictions determined from the processing of the current instruction. With the look-ahead feature, the context spiller 12 can also see where the next use is and with this information the register set is further trimmed based on the restriction(s) existing at the next use. In most cases, this allows the same hardware register to be reused.

The following pseudo-code provides guidance for coding the "Instruction Processing" and "Hardware Choosing Algorithms" discussed above. The pseudo-code is based on the "C++" programming language.

As described above with reference to FIG. 3, the Instruction Processing algorithm processes a single instruction at a time. In the pseudo-code implementation shown below, the order of operations is critical. The routines in the Instruction Processing algorithm include:

process_hw_kill (hwreg)—this routine forces reg to the INUSE state, then to FREE. This results in any symbolic register that was using reg to be forced to memory.

process_hw_use(hwreg)—this routine moves reg to the INUSE state. If a symbolic register is using reg, it is forced to memory. If a hardware register was not in INUSE state before, the register is spilled, so load from spill must be issued.

process_sr_use(srreg)—if srreg is in a hardware reg, the routine tries to use that register for this instruction. If it can't, the routine returns FALSE. If srreg is NOT in a register, the routine will find a register and rewrite the instruction to use it.

process_end_range(srreg)—this routine is called for dead uses. After this use, the hardware register reg is moved to FREE state.

process_hw_def(hwreg)—this routine moves the hardware register hwreg to INUSE. Any symbolic using reg will be forced to memory.

process_sr_def(srreg)—this routine performs the same function as the routine process_sr_use(ssreg), except for setting the pending store flag.

```
void SymRegModel: :process(PlSummary& pl) {
    int x,index;
    srobj sr;
    rewrite.work_on(pl); // this is the Pl we're going to modify
// 1 - Make sure all HW kills are in regs, then free (flushes symbolics)
    for (x=0; x<pl.num_kills(); ++x) {
        sr=pl.kill(x);
        if (sr.is_hwreg()) {
            index=sr.index()-sr.rclass().hw_index(0);
            process_hw_kill(regs(index));
        }
    }
// 2 - put all HW uses into regs, make them LIVE (flushes symbolics)
    for (x=0; x<pl.num_uses(); ++x) {
        sr=pl.use(x);
        if (sr.is_hwreg()) {
            index=sr.index()-sr.rclass().hw_index(0);
            process_hw_use(regs(index));
        }
    }
// 3 - for all SR uses that are in registers try to issue them.
//      if SR is in memory, or current register fails, push onto stack
    for (x=pl.num_uses()-1; x>=0; --x) {
        sr=pl.use(x);
        if (!sr.is_hwreg()) {
            if (symtab(sr).in_memory())
                temp.push(x);           // push index of use if its in memory
            else
                if (!process_sr_use(sr))  // rewrite using current reg if possible
                    temp.push(x);       // push index of use if current reg fails
        }
    }
// 4 - Stack temp now contains all the register that are in memory
//     we try to find hardware registers for them.
    while (!temp.empty()) {
        sr=pl.use(temp.pop());
        process_sr_use(sr);
    }
// 5 - Now we need to process all the DEAD uses to make them free.
//      if a symbolic is ALSO a def, we leave it live so that the same
//      register will be used for the def.
//      ie opcode r200=r200,1 want to use same reg for r200
    for (x=0; x<pl.num_uses(); ++x) {
        sr=pl.use(x);
        if (!pl.dead_use(x))        // only interested in dead uses
            continue;
        if (!sr.is_hwreg()) {
            int isadef=FALSE;
            for (int y=0; y<pl.num_defs(); y++) { // see if use is also a def
                if (sr==pl.def(y)) {
                    isadef=TRUE;
                    break;
                }
            }
            if (isadef)         // skip freeing if it is a def
                continue;
        }
        process_end_range(sr);
    }
// 6 - make all HW defs come alive. (force symbolics to memory)
    for (x=0; x<pl.num_defs(); ++x) {
        sr=pl.def(x);
        if (sr.is_hwreg()) {
            index=sr.index()-sr.rclass().hw_index(0);
            process_hw_def(regs(index));
        }
    }
// 7 - For all symbolic defs in a reg, try to rewrite using current reg
    for (x=pl.num_def()-1; x>=0; --x) {
        sr=pl.def(x);
        if (!sr.is_hwreg()) {
            if (symtab(sr).in_memory())
                temp.push(x);           // push index of def if its in memory
            else
                if (!process_sr_def(sr))   // rewrite using current reg if possible
                    temp.push(x);       // push index of def if current
                                        // reg fails
        }
    }
// 8 - Stack temp now contains all the register that are in memory
//     we try to find hardware registers for them.
    while (!temp.empty()) {
        sr=pl.def(temp.pop());
        process_sr_def(sr);
    }
// 9 - FINALLY. make all dead defs not live.
    for (x=0; x<pl.num_def(); ++x) {
        sr=pl.def(x);
        if (!pl.dead_def(x))        // only interested in dead uses
            continue;
        process_end_range(sr);
    }
    rewrite.replace_pl();       // rewrite if needed
}
```

Exemplary pseudo-code for implementing the procedure for choosing a hardware register for a symbolic register described above with reference to FIG. 4 is provided as follows:

```
HWReg& trueOracle: :choose_hwreg(SymRegister& reg) {
    int num_regs=model.reg_class().num_regs();
    BitVect valid(num_regs);
    PlObj pl=curr->pl();        // this is the instruction.
    int bufdex,x;
    hwstat st;
    pl.valid_regs(reg,valid);   // get valid register mask from instruction
    bufdex=GET_BUFFER_INDEX(reg); // if we can see the
                                  //      next occurrence
    if (bufdex != NO_BUFFER_INDEX) { // update the valid
                                     //   mask to include those
        plsum.first_ref_pl(reg).valid_regs(reg,valid,FALSE); // restrictions
    }
    BitVect try_these(valid);
    for (x=0; x<num_regs; x++)          // remove non-free registers
        if (model(x).status() != HW_FREE)
            try_these(x)=0;
    x=try_these.first_one();   // if this is >=0 then there is at least one
    if (x>=0) {
        return(choose_free(reg,try_these))
    }
    // No free register was available, so now we try these symbolics in
    //      hwregs
    try_these=valid;            // reset available mask to original
    for (x=0; x<num_regs; x++) {
        st=model(x).status();
        if (st != HW_SYMBOLIC)
            try these(x)=0;
    }
    x=try_these.first_one();    // if this is >=0 then there
                                //    is at least one
    if (x>=0)
        x-choose_ditch_sym(reg,try_these);  // try_these
                                            //   to get a symbolic
        if (x>=0) {             // if we got a symbolic
            return(model(x));   // return the register
        }
    }
    // otherwise, there are no free reg and there are no symbolics(at least
    // none we want to free up, so we have to spill a HW reg
    // remove all regs which have a symbolic in them (we already decided
    // it wasn't a good idea to reuse that register . . .
    // and lets remove the dedicated registers from these choices too
    // spilling grl (sr_rauto) would be a bad thing . . .
    // so we'll or in the dedicated registers
    try_these.ORvec(reg.rclass().dedicated());
    try_these.NEGvec(); // now a mask of all NON_SYMBOLIC registers
    valid.ANDves(try_these);
    return(choose_spill_hw(reg,valid));
}
```

It will be appreciated that the present invention provides a significant improvement over the known Chaitin style allocator. When registers need to be spilled, the same registers can be marked, and since there is never another pass of colouring, the context spiller 12 should never generate more spill code than a pure Chaitin colourer. It will be understood that according to the Chaitin technique, spilling a hardware register requires another pass of colouring, and the spilling of at least one more global register. In contrast, the local context spiller 12 according to present invention only introduces one more load and one more store for the hardware register, and only if a hardware register is not available in the block.

Another advantage of the present invention is that much better decisions can be made about how to generate the spill code since spilling is done on a local basis and with local knowledge.

The compile time of a compiler incorporating the register allocation according to the present invention tends to be much better. The register allocation method only performs one pass of the graph colourer and thereby avoids rebuilding the interference graph, and performing multiple graph reductions. Since the building of the interference graph and the graph reduction operation comprise the computationally intensive parts of the algorithm, reducing the number of the times these operations are performed improves the compile time.

Another advantage of the present invention is that the register allocation method tends to 'fan out' the sequences. As described above, the context spiller 12 tries to choose a free register if it can, so it tends to try to keep values in all hardware registers all the time. This helps prevent serialization in spill code. Serialization occurs when the same hardware register is used over a series of spill instructions.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A register allocation procedure for a compiler for converting a high level source code program into a machine executable program, the compiler includes an optimizer for translating the high level source code into an intermediate language wherein storage requirements for the program are specified as a plurality of symbolic registers, said register allocation procedure comprising the steps of:
   (a) generating an interference graph for said program;
   (b) reducing said interference graph via application of graph reduction techniques and selecting symbolic registers for spilling;
   (c) allocating machine registers to said program via graph colouring techniques without spilling; and
   (d) after a single iteration of steps (a) through (c), applying local context spilling to allocate machine registers to said symbolic registers selected for spilling that were not allocated using said graph colouring techniques, wherein said local context spilling comprises determining one or more free machine registers in a section of said intermediate language program, and allocating said free machine registers to the symbolic registers in said program, and when it is determined that the section does not have a free machine register, selecting a machine register for spilling and generating spill code for instructing said program to spill said selected machine register.

2. The register allocation method as claimed in claim 1, wherein said local context spilling step includes a look-ahead operation for determining which machine register is to be selected for spilling in the section of the program.

3. A compiler for converting a high level source code program into a machine executable program, said compiler comprising:
   a parser for translating said source code into an intermediate language program wherein storage requirements for said program are specified as a plurality of symbolic registers;
   an optimizer for optimizing operation of said intermediate language program;
   a register allocator for rewriting symbolic registers to machine registers in the intermediate language program;
   a code generator for generating the machine executable program from said rewritten intermediate language program;
   said register allocator having means for generating an interference graph for said intermediate language program, graph reduction means for reducing the number of symbolic registers in said interference graph and means for selecting symbolic registers for spilling, and graph colouring means for allocating machine registers to said symbolic registers without spilling; and
   said register allocator further including a local context spiller for allocating a machine register to a symbolic register selected for spilling and not allocated by said graph colouring means after a single execution of generating means, reducing means and colouring means, said local context spiller comprising means for determining availability of a free machine register in a section of said program and means for allocating said free machine register to said symbolic register, and said local context spiller further including means for selecting a machine register for spilling when the section of the program does not have any free machine registers.

4. The compiler as claimed in claim 3, wherein said local context spiller includes look-ahead means for looking-ahead and assessing the optimal machine register for spilling.

5. In a compiler for converting a high level source code program into a machine executable program, the compiler including a parser for translating high level source code program into an intermediate language program wherein storage requirements for the program are specified as a number of symbolic registers, the improvement comprising a register allocator for rewriting symbolic registers to machine registers in the intermediate language program, said register allocator comprising:
   means for generating an interference graph for said intermediate language program;
   graph reduction means for reducing the number of symbolic registers in said interference graph and means for selecting symbolic registers for spilling;
   graph colouring means for allocating machine registers to said symbolic registers without spilling; and
   a local context spiller for allocating a machine register to a symbolic register selected for spilling and not allocated by said graph colouring means after a single iteration of generating means, reduction means and colouring means;
   said local context spiller including means for determining availability of a free machine register in a section of said program and means for allocating said free machine register to said symbolic register, and said local context spiller further including means for selecting a machine register for spilling when the section of the program does not have any free machine registers.

6. A computer program product for use in a computer system to compile a high level source code program and generate a machine executable program, said computer program product comprising:

a recording medium;

means recorded on said medium for instructing said computer system to perform the steps of, (a) translating said high level source code into an intermediate language program wherein storage requirements for said program are specified as a plurality of symbolic registers;

(b) optimizing operation of said intermediate language program;

(c) rewriting symbolic registers to machine registers in the intermediate language program;

(d) generating the machine executable program from said rewritten intermediate language program;

(e) wherein rewriting said symbolic registers to machine registers comprises the steps of, generating an interference graph for said program, reducing said interference graph via application of graph reduction techniques and selecting symbolic resisters for spilling, allocating machine registers to said program via graph colouring techniques without spilling, applying local context spilling to allocate said symbolic registers selected for spilling which were not allocated using said graph colouring techniques after a single iteration of generating interference graph, reducing said interference graph and allocating machine registers via graph colouring, said local context spilling comprising determining one or more free machine registers in a section of said intermediate language program, and allocating said free machine registers to the symbolic registers in said program, and when it is determined that the section does not have a free machine register, selecting a machine register for spilling and generating spill code for instructing said program to spill said selected machine register.

* * * * *